UNITED STATES PATENT OFFICE.

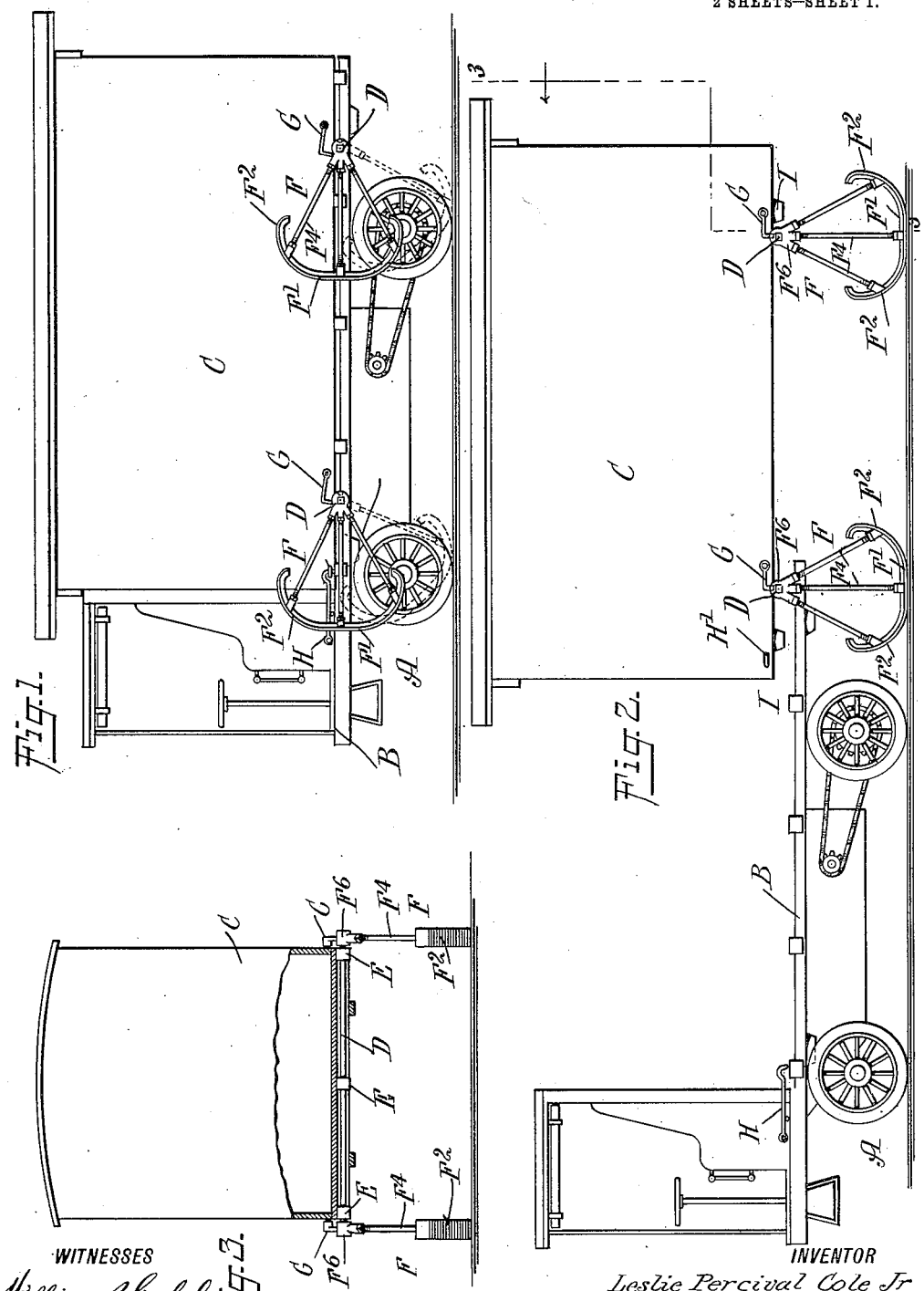

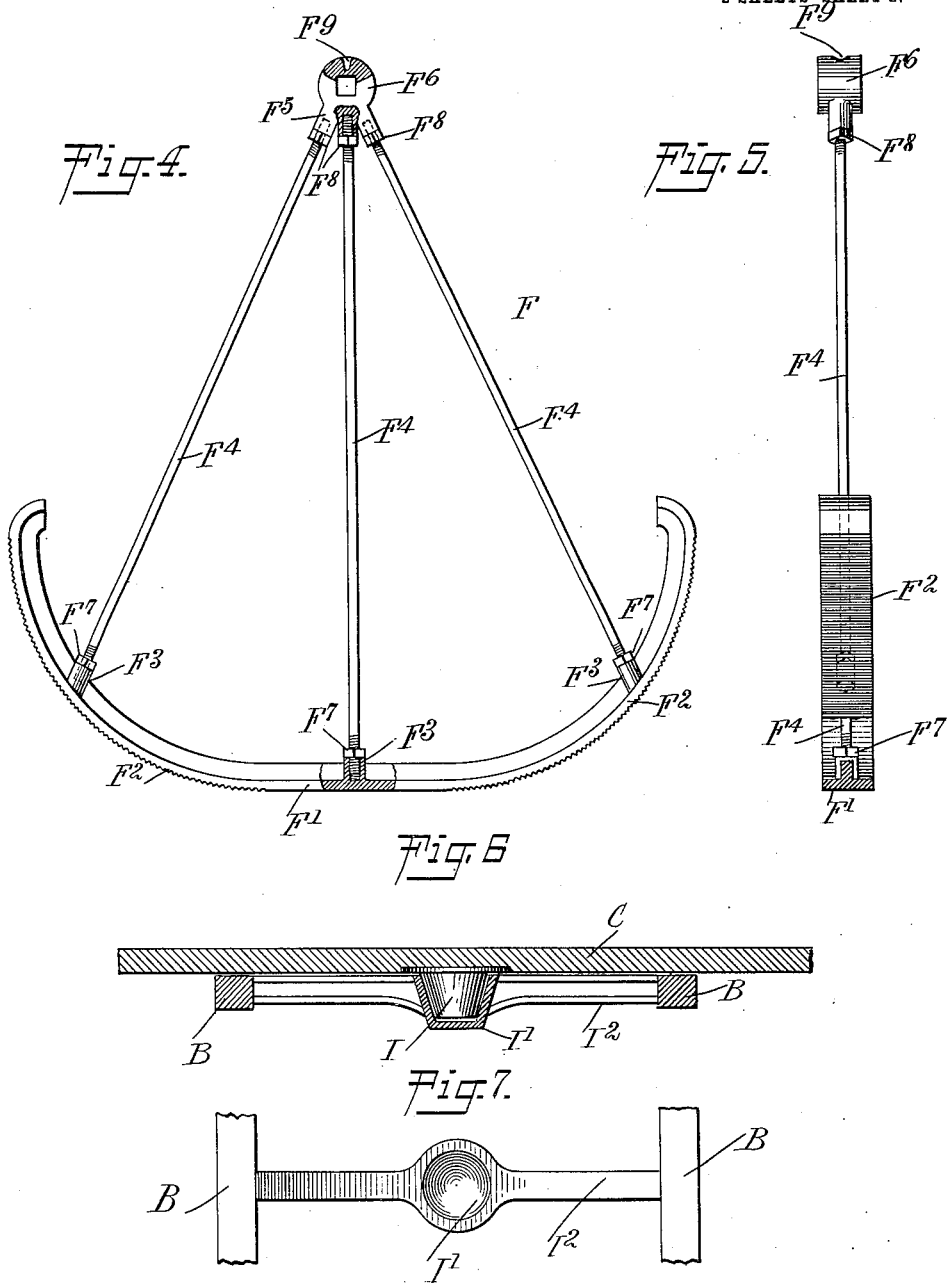

LESLIE PERCIVAL COLE, JR., OF WEEHAWKEN, NEW JERSEY.

AUTOMATIC TRUCK-BODY LIFTER.

1,049,210. Specification of Letters Patent. Patented Dec. 31, 1912.

Application filed March 23, 1912. Serial No. 685,754.

*To all whom it may concern:*

Be it known that I, LESLIE PERCIVAL COLE, Jr., a citizen of the United States, and a resident of Weehawken, in the county of Hudson and State of New Jersey, have invented a new and Improved Automatic Truck-Body Lifter, of which the following is a full, clear, and exact description.

The invention relates to vehicles, particularly to moving vans, auto trucks, sightseeing vehicles and the like, and its object is to provide a new and improved automatic truck body lifter, arranged to permit of lifting the body of the vehicle off the truck or chassis and supporting the said body while loading or unloading it, at the same time allowing using of the truck on another body or for other purposes.

For the purpose mentioned use is made of pairs of lifting legs attached to transverse shafts journaled on the vehicle body near the ends thereof, each lifting leg having a rim provided with a flat bottom, and upwardly and outwardly curved sides adapted to engage the floor or ground, to raise the body off the truck or chassis until the flat bottoms of the lifting legs move in contact with the ground or floor thus firmly supporting the body in raised position and allowing running the truck or chassis from under the raised body or back under the same.

A practical embodiment of the invention is represented in the accompanying drawings forming a part of this specification, in which similar characters of reference indicate corresponding parts in all the views.

Figure 1 is a side elevation of the automatic truck body lifter in inactive position on the vehicle; Fig. 2 is a like view of the same in active position and showing a body lifted and a truck run out from under the body; Fig. 3 is a cross section of the same on the line 3—3 of Fig. 2, the upper part of the body being shown in elevation; Fig. 4 is an enlarged side elevation of one of the lifting legs, parts being in section; Fig. 5 is an edge view of the same, part of the rim being shown in section; Fig. 6 is an enlarged cross section of the centering and guiding device for guiding the body onto the truck or chassis when lowering the body onto the truck; and Fig. 7 is a plan view of that part of the centering and guiding device attached to the truck.

The lifter is shown applied to a vehicle having a truck A provided with a chassis B supporting a body C adapted to be raised off the chassis B by the lifter or lowered back onto the chassis, as hereinafter more fully explained. On the under side of the body C are arranged transversely-extending fore and aft shafts D journaled in suitable bearings E attached to the under side of the body C. The ends of the shafts D project slightly beyond the sides of the body C and on the outer polygonal ends of the said shafts D are secured lifting legs F each having a rim provided with a flat central portion $F'$ and upwardly and outwardly curved ends $F^2$, the under or tread surfaces of which are preferably roughened, as plainly indicated in Figs. 3, 4 and 5. Each rim is preferably in inverted T-shape in cross section and is provided at the inner face with threaded bosses $F^3$ in which screw the ends of spokes $F^4$ screwing at their other ends in bosses $F^5$ extending from a hub $F^6$ having a polygonal opening or a bore engaging the corresponding polygonal end of the shaft D. In practice, one end of spoke $F^4$ is provided with a left-hand screw thread and the other end with a right-hand screw thread so that the spokes can be readily attached to the threaded bosses $F^3$ and $F^5$, and the spokes are then locked in place by jam nuts $F^7$, $F^8$ screwing on the threaded ends of the spokes $F^4$ and abutting against the bosses $F^3$ and $F^5$.

By the arrangement described an exceedingly strong and durable lifting leg is provided. The top of each hub $F^6$ is provided with a recess $F^9$ adapted to be engaged by the angular end of a locking arm G fulcrumed on the corresponding side of the body C so that when the lifting legs are in lowermost position, as shown in Fig. 2, then the locking arms G engage the said recesses $F^9$ to lock the lifting legs F in lowermost position, thus preventing accidental turning of the lifting legs and insuring a firm support of the body C (see Fig. 2). Normally the lifting legs F are held in uppermost position, as shown in Fig. 1, and when it is desired to lift the body C off the truck A then the lifting legs are swung downward so that the correspondingly curved sides $F^2$ engage the ground or floor on which the wheels of the truck A are standing at the time, and then the operator starts the vehicle forward so that the lifting legs F are caused to swing into vertical position and in doing so the lifting legs raise the body C off the chassis B of the truck A. It is understood that the legs F are so proportioned as to raise the body C sufficiently high above the chassis B of the truck A to allow of running the truck A from under the body C.

In order to prevent accidental sliding of the body C away from the truck A on starting the latter, use is made of hooks H pivoted one on each side to the truck A and engaging an eye or a staple H' on the body C, as plainly indicated in Figs. 1 and 2.

When the body C is in raised position the truck A can be used for engagement with other bodies C to move the same about or for other purposes, and the supported body C while in the raised and supported position can be loaded or unloaded, or, in case of sightseeing vehicles, the body can be stationed at a particular place for any desired length of time. When it is desired to again engage the body C with the truck A then the latter is run under the body C, the locking arms G are disengaged from the recesses F⁹ and the hooks H are engaged with the staples H', after which the truck is started either forward or backward so that the unlocked lifting legs are lowered and the body C is consequently lowered back onto the chassis B of the truck A.

In order to guide the body C into the proper position on the chassis B, use is made of centering and guiding devices on the under side of the body C near the forward and rear ends thereof, each centering and guiding device consisting of a conical head I secured to the under side of the body C and adapted to engage a correspondingly-shaped socket I' formed in the cross bar I² attached to the chassis B, as plainly indicated in Figs. 6 and 7. It is understood that when the body C is lowered the conical heads I readily pass into the sockets I', and even should the body C not be in exact position above the chassis B the heads I will engage the sockets I' and finally center the body C correctly on the chassis B.

Suitable means may be employed for fastening the body C to the chassis D while running the vehicle from one place to another, but such fastening devices are removed when it is desired to raise the body C from the truck, as above explained.

It is understood that the legs F raise the vehicle body C on starting the truck B in either a forward or backward direction, and likewise the vehicle body C is lowered in the same manner.

Any suitable means such as hooks may be employed to hold the legs F in normal inactive position.

Having thus described my invention, I claim as new and desire to secure by Letters Patent:

1. In combination, a vehicle having a truck and a truck body removably held thereon, fore and aft transverse shafts journaled on the said body and projecting beyond the sides thereof, lifting legs secured on the outer ends of the said shafts and each comprising a rim provided with a flat central portion and upwardly and outwardly curved ends, a hub, and spokes connecting the hub and rim, and locking devices held on the said body and adapted to engage the hub of the said lifting legs to lock the latter in position.

2. The combination with a vehicle having a truck and a body removably held on the truck, of fore and aft transverse shafts mounted on the body and projecting beyond the sides of the same, of lifting legs secured on the outer ends of said shaft, each leg comprising a hub having a peripheral recess, a rim, and spokes secured to the hub and rim, and pivoted locking arms on the body and having angular ends adapted to enter the recesses of the hubs of the said legs.

In testimony whereof I have signed my name to this specification in the presence of two subscribing witnesses.

LESLIE PERCIVAL COLE, Jr.

Witnesses:
   Theo. G. Hoster,
   Philip D. Rollhaus.